(No Model.) 2 Sheets—Sheet 2.
N. G. WILLIAMS.
CENTRIFUGAL SEPARATOR.
No. 565,197. Patented Aug. 4, 1896.
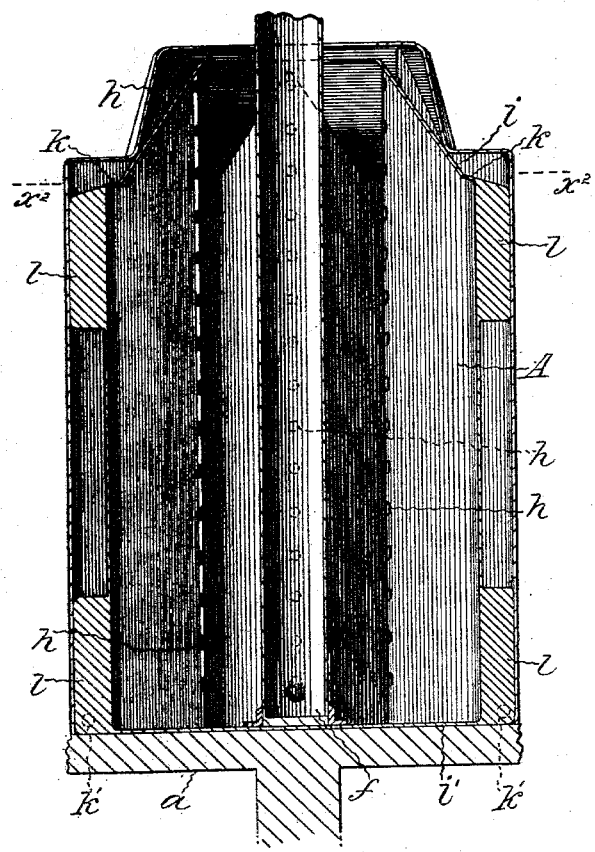
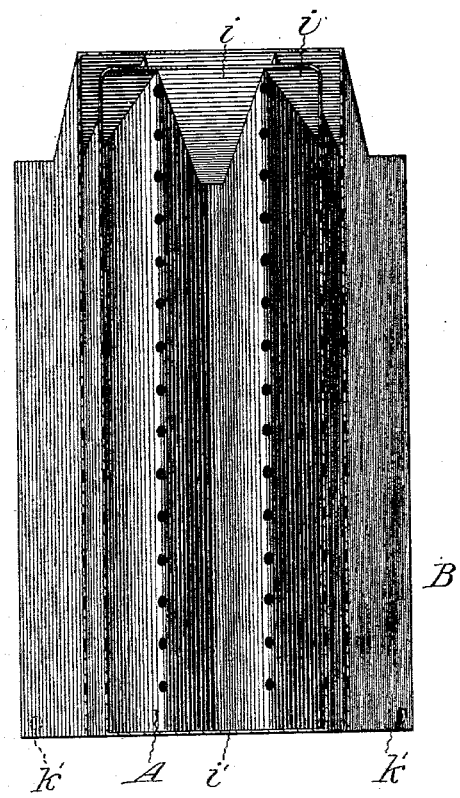
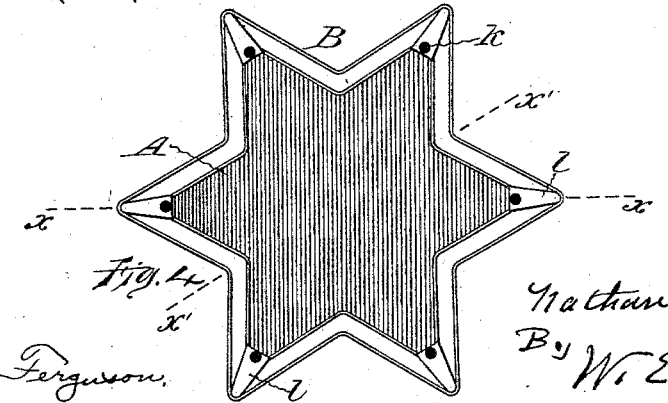
Witnesses
Andrew Ferguson.
C. E. Buckland.
Inventor
Nathan G. Williams
By W. E. Simonds
Atty

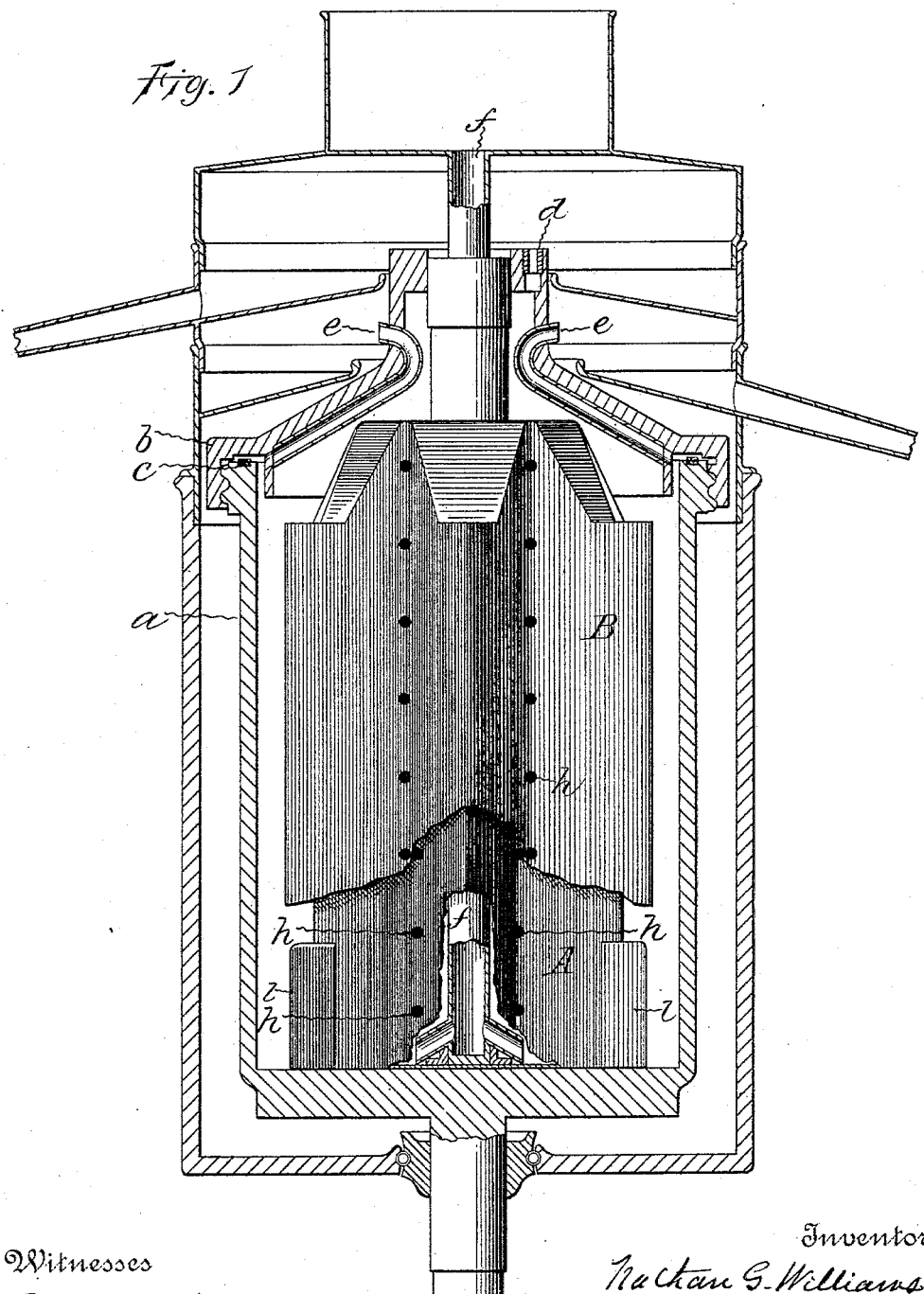

UNITED STATES PATENT OFFICE.

NATHAN G. WILLIAMS, OF BELLOWS FALLS, VERMONT.

CENTRIFUGAL SEPARATOR.

SPECIFICATION forming part of Letters Patent No. 565,197, dated August 4, 1896.

Application filed December 28, 1895. Serial No. 573,650. (No model.)

*To all whom it may concern:*

Be it known that I, NATHAN G. WILLIAMS, a citizen of the United States of America, residing at Bellows Falls, in the county of Windham and State of Vermont, have invented a certain new and useful Improvement in Centrifugal Separators, of which the following is a description, reference being had to the accompanying drawings, wherein—

Figure 1 is a view of a separator embodying said improvement, with the drum and outer case represented as cut in central vertical section. The partitions within are represented as broken away in part. Fig. 2 is a view of the said separating-partitions in central vertical section on a plane cutting the outer apexes of the partitions, which in horizontal cross-section are star-shaped, or of some other equivalent shape. The plane of this section is denoted by the dotted line $x\,x$ of Fig. 4. Fig. 3 is a view of the said separating-partitions in central vertical section on a plane cutting the inner apexes of such partitions. The plane of this section is denoted by the dotted line $x'\,x'$ of Fig. 4. Fig. 4 is a view of said separating-partitions in horizontal cross-section on plane $x^2\,x^2$ of Fig. 3.

The improvement pertains to a centrifugal separator for separating liquids of different densities, specially applicable to the separation of cream from whole milk, and the apparatus will be herein described as for use in that connection.

In the accompanying drawings the letter $a$ denotes the swiftly-rotating drum; $b$, the cover screwing upon the same; $c$, the rubber packing at the joint between the two; $d$, the cream-outlet; $e$, the blue-milk outlets, and $f$ a feed-pipe constituting an inlet for the whole milk.

The letter A denotes, as a whole, a continuous partition within the drum, which in its preferred shape is star-shaped in horizontal cross-section, as seen in Fig. 4. The inner apexes of this star-shaped partition are pierced at intervals along their length by apertures $h$ for the inflowing movement of cream. The outer apexes of this star-shaped partition are, in the main, unpierced by similar apertures.

The whole milk enters through the feed-pipe $f$ and escapes therefrom near the bottom of the drum within the inner partition A. Here the separation of the cream from the blue milk begins immediately. The latter, under centrifugal force, tends to move radially outward, thereby forcing the cream toward the center. This cream forms itself into a hollow tube on a line with the cream-outlet, the more watery part of the milk keeping this tube constantly supplied with cream, so that it is in an upright position and is practically, for the time being, as stable in position as a metal tube and keeps that position as long as the separator is kept supplied with milk and the outlets for cream and milk sustain proper relations to each other. The inflowing whole milk at the bottom of the partition constantly forces the mass of the liquid upward and outward. The separated or partially-separated milk within the partition A seeking the outer apexes thereof and flowing endwise, it will—if there be no obstruction to its flow at the upper end of partition A—naturally seek an escape from the drum through the blue-milk-outlet pipes $e$. It is, however, possible and desirable to repeat this process to a degree in an outer similar separating-partition, and such an arrangement is shown in the accompanying drawings.

Still speaking of the inner separating-partition A, the letters $i$ and $i'$ denote obstructions to the endwise flow of the milk, which are appurtenant to the outer apexes and are respectively located at or near the respective ends thereof. The letter $i$ denotes the uppermost of these obstructions and the letter $i'$ denotes the lowermost, it being, by preference, a floor fastened into the lower end of the inner partition A. Such a floor is of course, in a practical sense, a complete bar to the further endwise movement of the liquid in that direction. The obstruction $i$ at the top answers in every necessary degree to bar the further endwise motion of the liquid in that direction, and by thus obstructing such endwise flow of the milk they cause it to flow outwardly through the apertures $k$, each of which is contiguous to one of said obstructions. Meanwhile the cream of the inner cream-wall escapes from the drum through the cream-outlet $d$.

The letter B denotes, as a whole, an outer partition similar to and inclosing partition A. It has apertures similar to apertures $h$ for inflowing cream and endwise obstructions similar to obstructions $i\ i'$, (the latter being preferably the floor of the drum,) and apertures $k'$ similar to apertures $k$ for outflowing of milk; but by locating aperture $k$ in partition A at the top and aperture $k'$ in partition B at the bottom the milk is caused to travel upward on the inner wall of A and downward on the inner wall of B. Cream that is separated from the milk between the two partitions finds it way through apertures $h$ in partition A to join the said cream-wall, and cream that is separated from the milk outside of partition B finds its way through both sets of apertures $h$ to join the said cream-wall, and it may be that some portion thereof finds its way to said cream-wall over the top of the partitions.

The letters $l$ denote stays from one partition to the other fast, by preference, to the inner partition. The two partitions can be made as one structure, but it is preferable that they be separate.

Hereinbefore the liquid is spoken of as flowing endwise along the channels formed by the sides of the partitions which converge to the outer apexes of the partitions A and B. That is a main result, but, meanwhile, under the action of the forces generated by the swift rotation of the parts, the liquid makes much zigzag travel on what are slanting or approximately horizontal lines.

The partitions A and B are spoken of hereinbefore and hereinafter as being star-shaped in cross-section, and that is their preferred shape, but any other approximate shape which gives the outer and mainly closed endwise channels with the same inwardly-located apertures for the inflowing movement of the cream answers the same purpose and is intended to be included under the designation "star-shaped."

I claim as my improvement—

1. The rotary drum having inlet for full milk and outlets for blue milk and cream respectively, in combination with the partition A approximately star-shaped in horizontal cross-section with apertures $h$ along the length of the inner apexes and closed in the main along the outer apexes, all substantially as described and for the purposes set forth.

2. The rotary drum having inlet for full milk and outlets for blue milk and cream respectively, in combination with the partitions A B approximately star-shaped in horizontal cross-section with apertures along the length of the inner apexes for the inflowing movement and closed in the main along the outer apexes but with outer apex passages at one end of partition A and at the other end of partition B, all substantially as described and for the purposes set forth.

NATHAN G. WILLIAMS.

Witnesses:
FRANK G. DAY,
A. J. HOLLEY.